Nov. 1, 1932.  A. J. FRAME  1,885,248
MOTOR VEHICLE RADIATOR SHIELD
Filed July 17, 1931
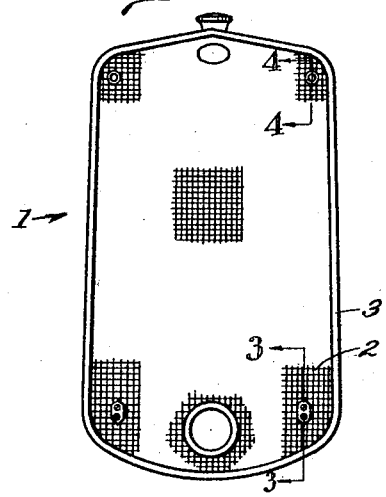
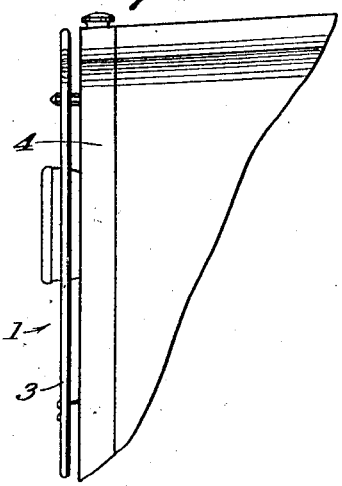
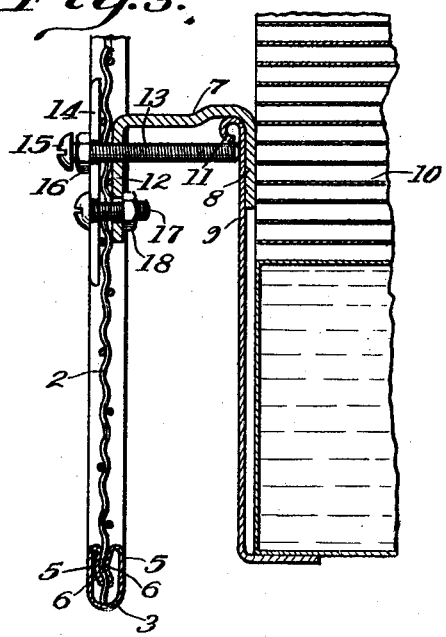
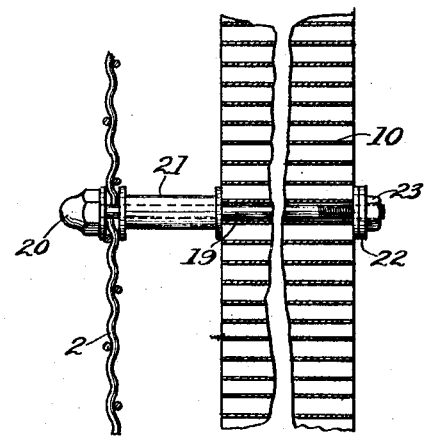
Inventor
A. J. Frame
By W. S. McDowell
Attorney Patented Nov. 1, 1932

1,885,248

UNITED STATES PATENT OFFICE

AUGUSTUS J. FRAME, OF COLUMBUS, OHIO, ASSIGNOR TO THE COLUMBUS AUTO BRASS COMPANY, OF COLUMBUS, OHIO, A CORPORATION OF OHIO

MOTOR VEHICLE RADIATOR SHIELD

Application filed July 17, 1931. Serial No. 551,438.

This invention relates to an improved ornamental protective shield formed to be applied to the front of a motor vehicle radiator and wherein the shield is constructed to include a woven wire body surrounded by a marginal frame and which when in use improves the appearance of a motor vehicle and at the same time functions as a protector for the radiator structure thereof.

It is an object of the present invention to provide a shield of the character set forth with improved means for effecting the secure fastening to the radiator of a vehicle in such manner that looseness and rattle are avoided and a secure and rigid union provided.

It is another object of the invention to form the thin marginal frame of the shield from rolled sheet metal wherein the frame includes spaced jaw portions which are securely forced into engagement with the edges of the woven wire body of the shield to retain said body under proper tension in connection with the frame without employing the use of solder or other fusible materials in effecting the connection.

Further, an additional object of the invention resides in the provision of a radiator shield of the character specified which may be conveniently and securely mounted in a detachable manner in connection with the front of a motor vehicle radiator; in the provision of a shield of adequate mechanical strength in the matter of protecting an associated radiator from injury and yet possessing an attractive and ornamental appearance; and in the provision of a shield which may be economically fabricated and applied to standard makes of motor vehicles.

With these, and other objects in view which will appear as the description proceeds, the invention consists in the novel features of construction, combinations of elements and arrangements of parts hereinafter to be more fully described and pointed out in the appended claims.

In the accompanying drawing:

Figure 1 is a front elevation of a radiator shield constructed in accordance with the present invention, Figure 2 is a side elevation of the shield illustrating its application to the front of a motor vehicle radiator, Figure 3 is a detailed vertical sectional view taken on the line 3—3 of Figure 1, Figure 4 is a similar view on the line 4—4 of Figure 1.

Referring more particularly to the drawing, the numeral 1 designates an improved radiator shield comprising the present invention in its entirety. The shield comprises essentially a foraminated body consisting preferably of woven wire of appropriate gauge and ornamentally finished with nickel or chromium plating presenting an attractive appearance and yet substantially rust-proof. The body 2 has its marginal portions received in a thin rolled sheet metal frame 3 which, as shown in Figure 1, conforms substantially to the outlines or external configuration of the radiator 4 of a motor vehicle in conjunction with the front of which the shield is employed. The frame comprises a single length of sheet metal material which is rolled or bent upon itself transversely to produce spaced sides 5—5 and these sides in turn terminate in inwardly bent transversely spaced flanges 6 which are forced into firm, positive holding engagement with the marginal portions of the body 2, gripping such marginal portions securely to place the wires composing the body under a proper degree of tension to keep the body in a straight, taut condition when in use. Moreover, this is accomplished without the use of solder, welding or fusible materials which have been commonly employed in screens or shields heretofore developed in articles of this type. The frame encloses the rough outer edges of the body 2, producing a rounded and finished marginal edge and, generally stated, the frame contributes substantially to the improved appearance of the shield. The flanges 6 readily conform, as shown in Figure 3, to the curvature of the registering portions of the wire body 2 and serve to lock the body in connection with the frame to prevent accidental relative separation between these parts.

In mounting the shield in place in connection with the radiator for active use in connection therewith, I employ at the lower end of the shield a pair of inverted U-shaped brackets 7. The inner leg 8 of each of these brackets is adapted to be positioned, as shown in Figure 3 between the shell plate 9 of the radiator and the core structure 10 of said radiator, fitting over the rolled upper edge 11 of the plate 9. The outer leg 12 of each bracket is provided with a pair of vertically spaced perforations. Through the upper of these perforations there passes a set screw 13 and the threaded shank of the screw also passes through registering openings formed in the wire body 2 and a pressure plate 14, applied to the front of the shield. Between the plate 14 and the head 15 of the set screw there is provided a lock nut 16 which engages with the threads of said screw, and it will be seen that by rotating the set screw in the threaded opening provided therefor in the outer leg 12 of the bracket, one end of the screw may be frictionally engaged with the shell plate 9 to force outwardly on the bracket 7, causing the inner leg 8 of the latter to be firmly and frictionally engaged with the inner surface of the plate 9. The nut 16 may then be tightened to draw the clamping plate 14 into binding engagement with the body 2 to retain the latter securely in engagement with the outer leg 12 of said bracket. An additional binding screw 17 is used and loosely passes through registering openings formed in the plate 14 in the lower portion of the leg 12. The threaded shank of the screw 17 is provided with a nut 18 which may be tightened to more securely lock the shield in connection with each of the spaced lower brackets 7.

The upper portion of the shield is clamped in connection with the radiator, as shown in Figure 4, by means of a plurality of horizontally disposed bolts 19. These bolts are provided with ornamental outer heads 20. The shank of each bolt passes through the wire body 2 and through a spacer sleeve 21, which maintains the shield in a vertical plane and properly spaced from the front of the radiator proper. The shank of each bolt 19 then continues through the radiator itself and in back of the radiator each shank is equipped with one or more washers 22 and binding nuts 23. When the nuts 23 are tightened, the heads 20 are drawn into clamping engagement with the body 2 and likewise the sleeves 21 are held under compression between the radiator 4 and the body 2. In this manner the upper portion of the shield is immovably held in conjunction with the radiator. However, by removing the nuts 23 the bolts 19 may be withdrawn from connection with the radiator and the shield proper. Similarly, by loosening the lock nut 16 and the screw 17, the lower portion of the radiator shield may be loosened and the entire shield removed as a unit from connection with the radiator.

When applied the shield is positively held in position and looseness and rattle are eliminated. The construction has the advantage of being especially strong and sturdy and while presenting an attractive appearance when normally viewed yet, in addition, it offers a very considerable degree of protection to the more fragile portions of the radiator proper.

What is claimed is:

1. The combination with the radiator shell of a motor vehicle, of a foraminated shield positioned in front of the radiator shell, a bracket having spaced depending legs, one of said legs being engaged with the radiator shell and the other of said legs engaging the shield body, and a screw threadedly mounted in an opening provided in the leg of said bracket in engagement with said shield, the forward end of said screw being engaged with said radiator shell to place said bracket under tension and to maintain the same in frictional holding engagement with said shell.

2. Securing means for connecting a radiator shield in front of an associated automobile radiator, comprising a substantially U-shaped bracket having a threaded opening formed in one of the legs thereof, the other leg of said bracket being adapted to be received between an associated radiator shell and a radiator body, a wire radiator shield in engagement with the outer leg of said bracket, clamping means for securing said shield to the outer leg of said bracket, and a set screw located in the threaded opening of said bracket and cooperative with said radiator shell to maintain said bracket in frictional holding engagement therewith.

3. Securing means for retaining a radiator shield in a mounted position in advance of an associated automobile radiator comprising a bracket including spaced inner and outer vertically depending legs, the inner of said legs being adapted to be positioned between the shell and body of the radiator and to overlie the upper edge of said shell, a wire shield in engagement with the outer leg of said bracket, separable clamping means for uniting said wire shield directly with the outer leg of said bracket, and a set screw adjustably positioned in the threaded opening formed in connection with the outer leg of said bracket, the inner ends of said set screw being adapted to frictionally engage with said shell to place said bracket under tension and maintain the same in frictional engagement with said shell.

4. The combination with the radiator of a motor vehicle and its shell, of a wire screen shield detachably secured to the front of said radiator, brackets carried by said shield including down turned inner extremities arranged to be positioned between said radiator and its shell, and threaded means for maintaining said brackets in frictional engagement with said shell.

5. The combination with the radiator of a motor vehicle, of a shield positioned in front of said radiator, stationary hook members carried by said shield and arranged to be positioned between said radiator and the lower portion of the shell thereof, threaded means carried by said shield positively retaining said hook members in frictional engagement with said shell, and securing devices passing through said radiator and the upper portion of said shield.

6. The combination with the radiator of a motor vehicle, of a shield positioned in front of said radiator, stationary hook members carried by said shield and arranged to be positioned between said radiator and the lower portion of the shell thereof, threaded means carried by said shield positively retaining said hook members in frictional engagement with said shell, securing devices passing through said radiator and the upper portion of said shield, and spacers carried by said securing devices and positioned between said radiator and said shield.

In testimony whereof I affix my signature.

AUGUSTUS J. FRAME.